United States Patent
Chen et al.

(10) Patent No.: US 7,495,865 B2
(45) Date of Patent: Feb. 24, 2009

(54) ADHESION LAYER FOR PROTECTIVE OVERCOAT

(75) Inventors: Fang Chen, Eden Prairie, MN (US); Joel W. Hoehn, Hudson, WI (US); Yongping Gong, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 472 days.

(21) Appl. No.: 11/400,957

(22) Filed: Apr. 10, 2006

(65) Prior Publication Data

US 2007/0236837 A1  Oct. 11, 2007

(51) Int. Cl.
*G11B 5/60* (2006.01)
(52) U.S. Cl. .................. 360/235.4; 428/64.1
(58) Field of Classification Search ............. 360/235.4; 428/64.1
See application file for complete search history.

(56) References Cited

U.S. PATENT DOCUMENTS

| | | |
|---|---|---|
| 4,130,847 A | 12/1978 | Head et al. |
| 4,647,494 A | 3/1987 | Meyerson et al. |
| 5,159,508 A | 10/1992 | Grill et al. |
| 5,175,658 A | 12/1992 | Chang et al. |
| 5,271,802 A | 12/1993 | Chang et al. |
| 5,858,182 A | 1/1999 | Horng et al. |
| 5,948,532 A | 9/1999 | Hwang et al. |
| 5,964,942 A * | 10/1999 | Tanabe et al. .............. 117/87 |
| 5,985,163 A | 11/1999 | Cha et al. |
| 6,136,421 A | 10/2000 | Chen |
| 6,150,258 A | 11/2000 | Mountsier et al. |
| 6,583,953 B1 | 6/2003 | Han et al. |
| 6,638,608 B1 | 10/2003 | Gui et al. |
| 6,664,685 B2 | 12/2003 | Ameen et al. |
| 6,961,213 B2 | 11/2005 | Ameen et al. |
| 2001/0004499 A1 * | 6/2001 | Horng et al. .......... 428/694 TC |
| 2005/0181238 A1 | 8/2005 | Ma et al. |
| 2005/0201012 A1 * | 9/2005 | Kasamatsu et al. ....... 360/235.1 |
| 2006/0077593 A1 * | 4/2006 | Ueda ..................... 360/235.1 |

\* cited by examiner

*Primary Examiner*—Angel A. Castro
(74) *Attorney, Agent, or Firm*—Kinney & Lange, P.A.

(57) ABSTRACT

An apparatus includes a metal substrate, an amorphous adhesion layer on the metal substrate, and a protective DLC layer over the adhesion layer. The adhesion layer has a thickness of less than about 8 Angstroms, and has a composition of carbon silicon carbide or carbon silicon nitride. The composition of the adhesion layer provides corrosion resistance for the metal substrate.

10 Claims, 3 Drawing Sheets

ADHESION LAYER FOR PROTECTIVE OVERCOAT

BACKGROUND OF THE INVENTION

The present invention relates generally to a protective film that coats a metal substrate. More particularly, the present invention relates to a thin adhesion layer for a surface of a magnetic read/write head that exhibits sufficient adhesive properties and improved corrosion resistance.

Disc drive storage systems are used for storage of digital information that can be recorded on concentric tracks of a magnetic disc medium. Several discs are rotatably mounted on a spindle, and the information, which can be stored in the form of magnetic transitions within the discs using a write transducer, is accessed using a read transducer. The read and/or write transducer is carried by a slider that is located on an actuator arm that moves radially over the surface of the disc. The slider and transducer can be collectively referred to as a magnetic head.

The discs are rotated at high speeds during operation. As the discs are spun, the slider and the read and/or write transducer glide above the surface of the disc on a small cushion of air. Upon reaching a predetermined high rotational speed, the head floats in air at a predetermined distance from the surface of the disc where it is maintained during reading and recording operations. In order to maximize the high areal recording density, the flying height (i.e. the distance by which the head floats above the surface of the disc) must be minimized.

It is well known in the art to coat the air bearing surfaces of the head and the disc with a diamond like carbon (DLC) protective overcoat and/or a lubricant layer. The function of the DLC overcoat is to protect underlying metals and alloys from wear and corrosion during the manufacturing process, and throughout the lifetime of the disc drive system. As applied to the head, the DLC overcoat includes a DLC layer and an adhesion layer. DLC overcoat thickness for the head can range from about 20 to 30 Angstroms while typical values of DLC overcoats for magnetic media are in excess of 30 Angstroms. The DLC overcoat thicknesses, along with the lubricant thickness, are the biggest contributors of head media separation (HMS) distance. The HMS distance is measured from the magnetic surface of the head to the magnetic surface of the media. The HMS distance in turn affects the data reading and writing efficiency of the transducer.

The adhesion layer of the DLC overcoat is used to attach the DLC layer to the surface of the head. It is well known in the art to use silicon for the adhesion layer. However, silicon provides limited corrosion protection, and moreover, if a silicon adhesion layer is made thinner, the DLC overcoat becomes vulnerable to reliability failure due to weakened adhesion, reduced corrosion resistance, or both.

There is a need to decrease the HMS distance, and increase recording areal density, through use of a thinner DLC overcoat that still exhibits sufficient adhesion properties and improved corrosion resistance.

BRIEF SUMMARY OF THE INVENTION

The present invention relates to an apparatus that includes a metal substrate, an amorphous adhesion layer on the metal substrate, and a protective DLC layer over the adhesion layer. The adhesion layer has a thickness of less than about 8 Angstroms, and has a composition of carbon silicon carbide or carbon silicon nitride. The composition of the adhesion layer provides corrosion resistance for the metal substrate.

DETAILED DESCRIPTION

Figure 1A:
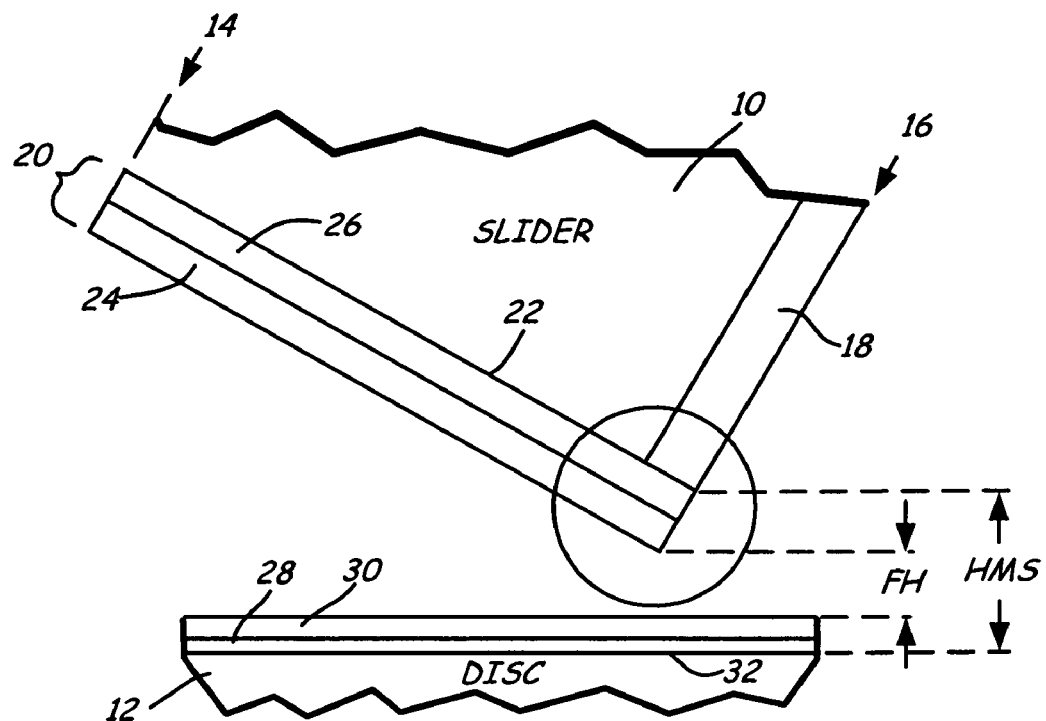
FIG. 1A is a schematic of a portion of a slider of a disc drive, including a read and/or write transducer, and a storage media.

FIG. 1A is a schematic of a portion of slider 10 and magnetic media disc 12 of a disc drive storage system. Slider 10 has leading edge 14 and trailing edge 16, and includes read and/or write transducer 18. Slider 10 and transducer 18 may be collectively referred to as a magnetic head. Protective overcoat 20 is applied to surface 22 of slider 10 and includes diamond-like carbon (DLC) layer 24 and adhesion layer 26. Carbon layer 28 and lubricant layer 30 are applied to surface 32 of disc 12. Layers 24, 26, 28 and 30 are all exaggerated in thickness for illustrative purposes. As explained in more detail below, specifically with reference to layers 24 and 26, all of these layers are extremely thin.

Slider 10 is connected to a suspension (not shown) including an actuator arm and a load beam that operates to position slider 10 and transducer 18 over a pre-selected data track of the disc. Transducer 18 either reads data from or writes data to the pre-selected data track of disc 12, as disc 12 rotates below slider 10 and transducer 18. Slider 10 is configured such that DLC layer 24 on surface 22 is an air bearing surface that causes slider 10 to fly above the data tracks of disc 12 due to interaction between the air bearing surface of slider 10 and fluid currents that result from rotation of disc 12. As disc 12 reaches its operating rotational velocity, slider 10 pivots such that leading edge 14 of slider 10 rises to a higher level than trailing edge 16 of slider 10, as shown in FIG. 1A. As such, transducer 18 is brought closer to disc 12, which allows more data to be written onto disc 12 and improves the overall electrical performance of the disc drive. However, a minimum clearance between slider 10 and disc 12 must be maintained so that slider 10 does not crash onto disc 12, which is rotating at a high velocity.

As shown in FIG. 1A, fly height FH is a distance or clearance between the air bearing surface of slider 10, which is DLC layer 24, and a surface of disc 12, which is lubricant layer 30. Head media separation HMS is a distance between magnetic surface 22 of transducer 18 and opposing magnetic surface 32 of disc 12. Thus, head media separation HMS includes layers 24 and 26 applied to slider 10 and layers 28 and 30 applied to disc 12. Fly height FH and head media separation HMS are measured when slider 10 and transducer 18 are floating above disc 12, once disc 12 has reached its operating rotational speed.

Protective overcoat 20 is applied to surface 22 of slider 10. Primary functions of overcoat 20 are to protect against wear and corrosion. In particular, it is important to protect the exposed metal parts of transducer 18 which are susceptible to corrosion or oxidation. Layer 24, formed of diamond-like carbon (DLC) is configured to provide corrosion resistance to slider 10. Diamond-like carbon is a preferred material for protective overcoat 20 due to its high hardness, high wear resistance, low coefficient of friction and chemical inertness. A disadvantage of a DLC film is that it does not sufficiently adhere to all surfaces, like surface 22 of slider 10. Therefore, adhesion layer 26 is used to attach DLC layer 24 to slider 10.

Adhesion layer 26 uses silicon as a main component. Silicon easily adheres to metal. In fact, when silicon is deposited onto a metal surface, the silicon reacts with the surface and forms a silicide. Thus, if adhesion layer 26 was formed primarily of silicon, adhesion layer 26 would adhere well to slider 10. Moreover, diamond-like carbon adheres well to silicon, forming silicon-carbon bonds. As such, a silicon adhesion layer would work well to attach DLC layer 24 to surface 22 of slider 10. However, silicon contributes minimal corrosion resistance to overcoat 20. Moreover, because silicon reacts with surface 22, some of the silicon diffuses into surface 22, which then requires more silicon to be deposited onto surface 22 in order for carbon layer 24 to bond with and adhere to the silicon. As such, the thickness of an essentially pure silicon adhesion layer can only be reduced so much before insufficient adhesion of the carbon layer is observed.

The present invention includes a composition for adhesion layer 26 that contributes corrosion resistance to overcoat 20 and results in a reduced overall thickness of overcoat 20. Alternatively, the overall thickness of overcoat 20 may remain similar in thickness to current overcoat designs, yet exhibit greater corrosion resistance by comparison, due to the composition of adhesion layer 26.

Figure 1B:
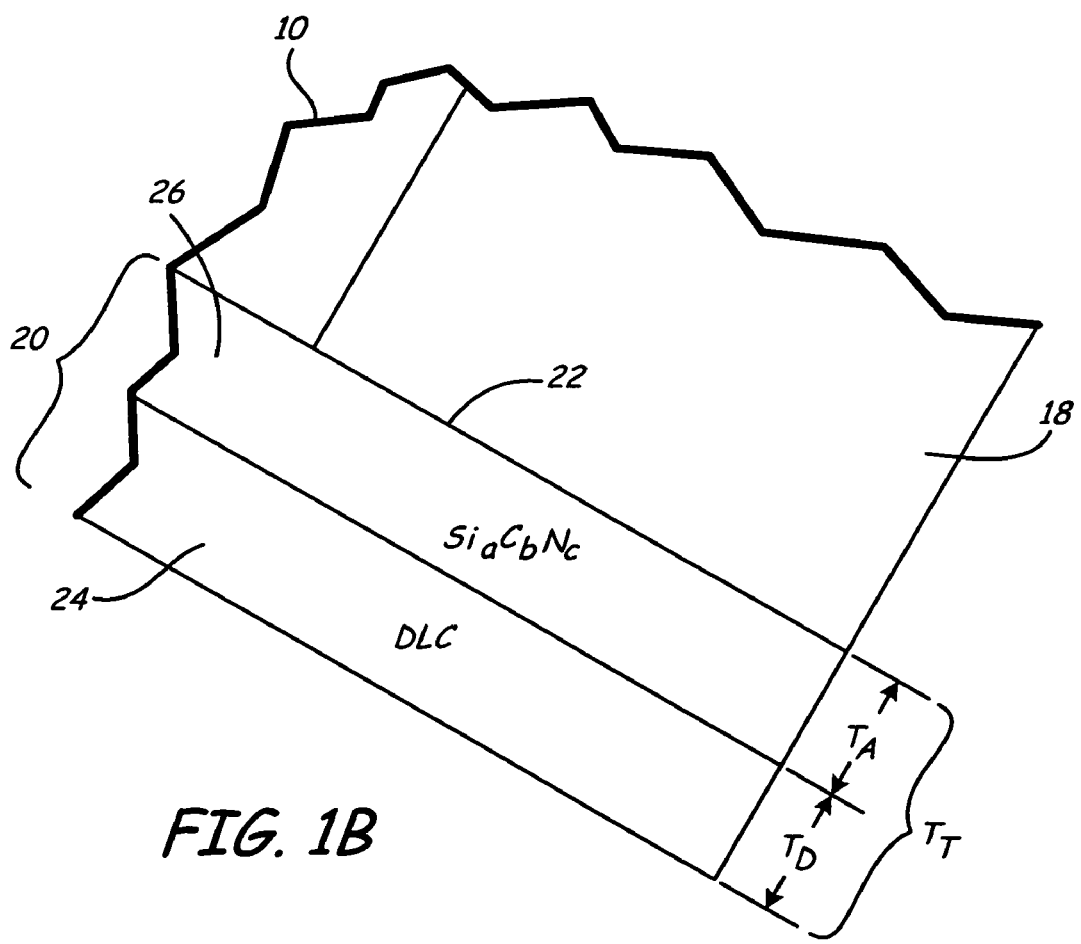
FIG. 1B is a magnified view of a portion of the slider in FIG. 1A showing a protective overcoat on a surface of the slider.

FIG. 1B is a magnified view of a portion of slider 10 in FIG. 1A showing transducer 18 and protective overcoat 20, including adhesion layer 26 having thickness $T_A$, and DLC layer 24 having thickness $T_D$. Total thickness $T_T$ is equal to $T_A$ plus $T_D$, and is the thickness of overcoat 20. A person of skill in the art will recognize that adhesion layer 26 and DLC layer 24 will both exhibit some variation in thickness across layers 26 and 24; thus thicknesses $T_A$ and $T_D$ are an average thickness of layers 26 and 24, respectively.

Adhesion layer 26 is an amorphous blend of silicon with additional components, including, but not limited to, carbon and nitrogen. As shown in FIG. 1B, adhesion layer 26 is labeled as $Si_a C_b N_c$, which describes the composition of adhesion layer 26 as a blend of silicon, carbon and nitrogen, as an optional third component, where a, b, and c represent the compositional range of each element in atomic percent. As further described with reference to specific embodiments, a may range from about 15 to 50 atomic percent, b may range from about 10 to 85 atomic percent, and c may range from 0 to less than about 60 atomic percent. Source materials within this range of compositions are commercially available.

In one embodiment, adhesion layer 26 is formed of silicon and carbon with silicon comprising between about 15 and 35 atomic percent, and carbon comprising between about 65 and 85 atomic percent. A preferred composition of silicon and carbon is about 20 to 30 atomic percent silicon and about 70 to 80 atomic percent carbon. Adhesion layer 26 may be formed from a target of silicon carbide blended with additional carbon, resulting in carbon silicon carbide (CSiC).

In another embodiment, adhesion layer 26 is formed of carbon silicon nitride (CSiN) with silicon comprising between about 30 and 50 atomic percent, carbon comprising between about 10 and 25 atomic percent, and nitrogen comprising between about 25 and 55 atomic percent. A preferred composition for carbon silicon nitride is about 45 atomic percent silicon, about 15 atomic percent carbon, and about 40 atomic percent nitrogen.

For the embodiments introduced above, adhesion layer 26 is an amorphous film of silicon blended with carbon, or silicon blended with both carbon and nitrogen. The amorphous blend for each of the embodiments is a random distribution of silicon, carbon and nitrogen atoms. Therefore, the above nomenclature (CSiC, CSiN) for the described embodiments does not indicate a predictable or repeatable pattern of bonding between elements. All embodiments and compositional ranges of adhesion layer 26 are described as an atomic percent.

When adhesion layer 26 is an amorphous blend of silicon mixed with a second element and an optional third element, adhesion layer 26 exhibits significant advantages compared to an adhesion layer of silicon only. Adhesion layer 26 ($Si_a C_b N_c$) contributes corrosion resistance to overcoat 20, independent of DLC layer 24. Moreover, there is minimal diffusion of adhesion layer 26 into surface 22. As such, not as much of adhesion layer 26 is required to be deposited onto surface 22 to form a uniform layer that provides adequate adhesion for DLC layer 24. Thus, thickness $T_A$ of adhesion layer 26 can be reduced. Of even more benefit, because adhesion layer 26 is corrosion resistant, thickness $T_D$ of DLC layer 24 can also be reduced. Thus, the reduction in total overcoat thickness $T_T$ of overcoat 20 is two-fold.

Due to the unique composition of adhesion layer 26, it is possible for protective overcoat 20 to be thinner compared to current configurations of a protective overcoat for a magnetic recording head. Head media separation HMS is reduced as a result of a reduction in total thickness $T_T$ of overcoat 20. Despite protective overcoat 20 being made thinner, it still has sufficient adhesion and corrosion resistance due to the composition of adhesion layer 26. An additional benefit of adhesion layer 26 is its improved oxidation resistance as compared to an adhesion layer of essentially only silicon.

On the other hand, if increased corrosion robustness is needed or desired, protective overcoat 20 may be designed to have a comparable thickness to current configurations of a protective overcoat for a magnetic recording head. Due to the composition of adhesion layer 26, overcoat 20 will exhibit greater corrosion resistance as compared to current overcoats having a comparable thickness.

To achieve a thinner overcoat 20 and reduce head media separation HMS as compared to current designs, a suitable range for thickness $T_A$ of adhesion layer 26 is between about 4 and 10 Angstroms, and a suitable range for thickness $T_D$ of DLC layer 24 is between about 7 and 15 Angstroms. Thus, total thickness $T_T$ of protective overcoat 20 is consistently less than about 25 Angstroms. In a preferred range, total thickness $T_T$ of protective overcoat 20 is between about 12 and 20 Angstroms.

If the intent is to increase overall corrosion resistance of overcoat 20, instead of minimizing total thickness $T_T$ of overcoat 20, a suitable range for thickness $T_A$ of adhesion layer 26 is between about 10 and 15 Angstroms, and a suitable range for thickness $T_D$ of DLC layer 24 is between about 15 and 20 Angstroms. In these embodiments, total thickness $T_T$ of overcoat 20 is between about 25 and 30 Angstroms.

Although adhesion layer 26 has been discussed with regard to specific embodiments, additional components that exhibit the adhesion and corrosion resistant properties desired, when mixed with silicon, are within the scope of the present invention.

Adhesion layer 26 may be formed using any known thin film deposition technique, including, but not limited to, evaporation, sputtering or plasma deposition. Commonly, adhesion layer 26 is deposited onto surface 22 of slider 10 by physical vapor deposition. In a preferred method, adhesion layer 26 is formed through ion beam sputter deposition or DC-magnetron sputtering. However, almost any type of physical vapor deposition or chemical vapor deposition process could be used.

Similarly, DLC layer 24 may be formed using any known thin film deposition technique. In a preferred method, DLC layer 24 is deposited using a filtered cathodic arc (FCA) source.

As known in the art, an ellipsometer is used to monitor and measure thickness $T_A$ of adhesion layer 26 and thickness $T_D$ of DLC layer 24 as layers 26 and 24 are deposited. To analyze the composition of adhesion layer 26 (i.e. atomic percent of silicon, carbon, and, in some embodiments, nitrogen), x-ray photoelectron spectroscopy (XPS) is used. Other methods of analyzing the composition include, but are not limited to, auger electron spectroscopy (AES) and secondary ion mass spectroscopy (SIMS).

As described above, protective overcoat 20 is deposited on all of surface 22 of slider 20, which includes read and/or write transducer 18. However, it is recognized that overcoat 20 would not necessarily have to be coated on the entire surface 22 of slider 10, and that only those portions of surface 22 that are susceptible to corrosion, including transducer 18, could alternatively be coated. At the same time, it is recognized that selectively coating specific portions of surface 22 of slider 10 would be time consuming and costly. Moreover, there are additional, secondary benefits, including a tribological benefit, to coating the entire surface 22 of slider 10.

EXAMPLES

The present invention is more particularly described in the following examples that are intended as illustrations only, since numerous modifications and variations within the scope of the present invention will be apparent to those skilled in the art. The compositions for the examples below are based on atomic percent.

Examples 1-6

Examples 1-6 were essentially identical in the composition of adhesion layer 26 and DLC layer 24. The method of forming adhesion layer 26 and DLC layer 24 was essentially identical across examples 1-6. The variables among examples 1-6 were thickness $T_A$ of adhesive layer 26 and thickness $T_D$ of DLC layer 24.

Examples 1-6 were made starting with a carbon silicon nitride target. In the alternative, a silicon carbide target could be used, and nitrogen gas could be added to the environment during processing to create a carbon silicon nitride adhesion layer. In this case, where a carbon silicon nitride target was used, the target composition was about 45 atomic percent silicon, about 15 atomic percent carbon, and about 40 atomic percent nitrogen. The actual composition of adhesion layer 26 may vary slightly based on the ion beam deposition process. The composition of adhesion layer 26 can be determined through an x-ray photoelectron spectroscopy (XPS) depth profile technique.

For examples 1-6, adhesion layer 26 was deposited onto surface 22 of slider 10 through ion beam sputter deposition. The process parameters for the ion beam included a beam voltage of approximately 550 volts, a beam current of approximately 200 mA, and a suppressor voltage of approximately 200 volts. Thickness $T_A$ of adhesion layer 26 was monitored during deposition using an in-situ ellipsometer.

DLC layer 24 was deposited onto adhesion layer 26 by a filtered cathodic arc (FCA) deposition process. Thickness TD of DLC layer 24 was similarly monitored during deposition using the in-situ ellipsometer.

Table 1 below outlines thicknesses $T_A$ and $T_D$ of adhesion layer 26 and DLC layer 24 for each of examples 1-6. Table 1 also shows total thickness $T_T$ of protective overcoat 20. Comparative example A, also listed in Table 1 below, was included as a control sample. In comparative example A, the composition of adhesion layer 26 was essentially pure silicon.

TABLE 1

| Example Number | $T_A$ (Angstroms) - Adhesion Layer 26 CSiN | $T_D$ (Angstroms) - DLC Layer 24 | Total Thickness $T_T$ (Angstroms) - Overcoat 20 |
| --- | --- | --- | --- |
| 1 | 10 | 8 | 18 |
| 2 | 8 | 13 | 21 |
| 3 | 8 | 10 | 18 |
| 4 | 8 | 7 | 15 |
| 5 | 6 | 13 | 19 |
| 6 | 4 | 13 | 17 |
| Comparative Example A* | 8.5* | 12.5 | 21 |

*As explained above, adhesion layer 26 of comparative example A was pure silicon.

Tests were conducted on examples 1-6 and comparative example A to analyze the corrosion resistance of adhesion layer 26 and DLC layer 24 as a result of the composition of adhesion layer 26 (carbon silicon nitride), as compared to an adhesion layer of pure silicon (comparative example A).

A DC polarography test was performed on examples 1-6 and comparative example A to observe the corrosive properties of examples 1-6, in comparison to comparative example A. The testing conditions included 0.05 M of sodium chloride (NaCl) solution, a controlled pH value between about 5.4 and 5.7, a testing area of about 1 $cm^2$, and testing at room temperature. A potentiostat was used to sweep an electrochemical potential from a negative voltage up to a positive voltage, and measure the current that flowed as a function of potential. Current is essentially proportional to the corrosion rate. A Tafel plot, as shown in FIG. 2, was used to illustrate the results of the DC polarography test for examples 1-6 and comparative example A.

Figure 2:
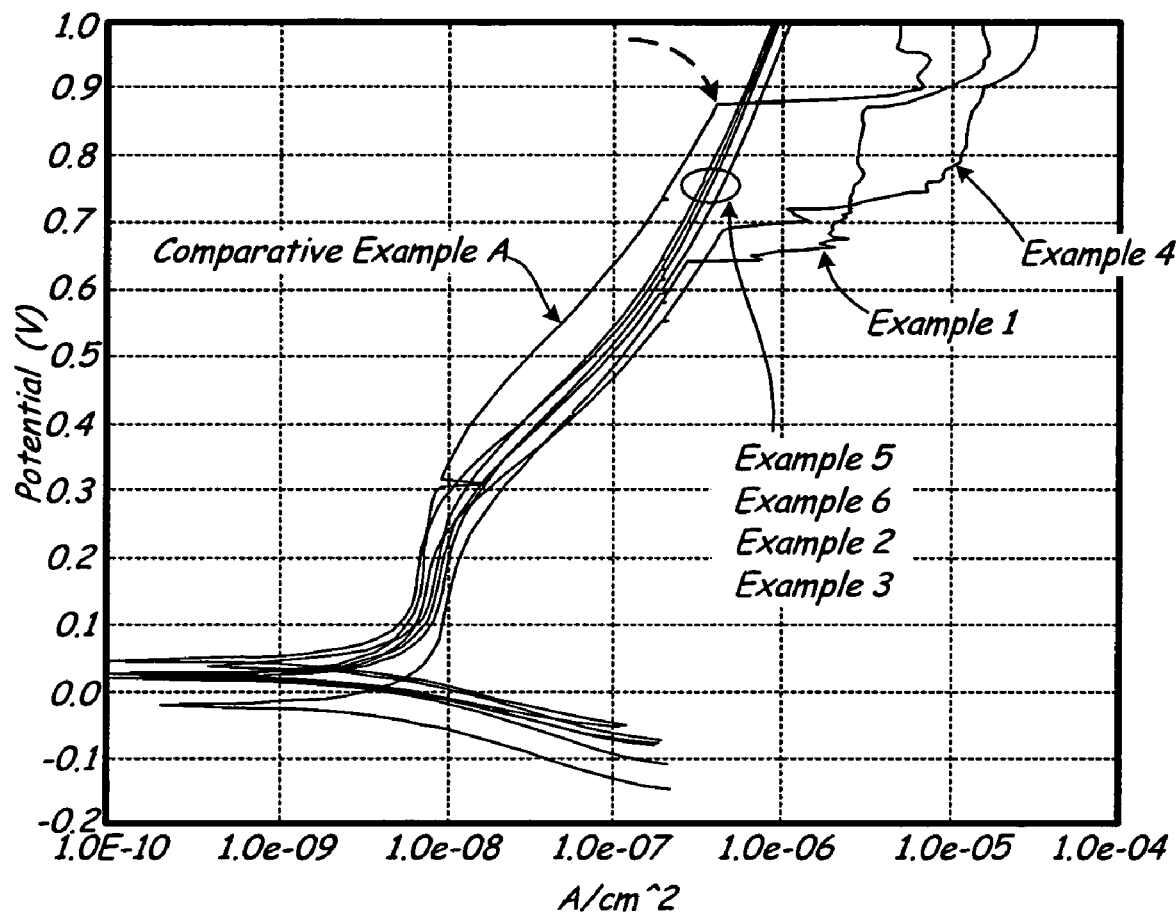
FIG. 2 is a graph of current as a function of potential to show the corrosion resistance of Examples 1 through 6 of the present invention.

FIG. 2 is a plot of current as a function of potential. A film exhibits better corrosion resistance if it is able to endure a higher current without exhibiting film failure, which includes pitting and other mechanisms indicating a breakdown in the film's ability to resist corrosion. Film failure is indicated for a particular sample where there is an abrupt increase in current at a relatively constant potential. The ability to withstand higher potentials before failure is preferred.

Comparative example A exhibited failure at a potential of approximately 0.875 volts. (The broken-line arrow in FIG. 2 shows where film failure occurred for comparative example A. Examples 1-6 exhibited film failure when there was a similar shift in the curve to that marked for comparative example A.) Examples 1 and 4 with thickness $T_D$ of DLC layer 24 equal to 8 Angstroms and 7 Angstroms, respectively, both exhibited failure at lower potentials (approximately 0.65 and 0.7 volts). Examples 2-3, and 5-6 had not yet exhibited failure at a potential up to 1.0 volt.

The Tafel plot of FIG. 2 shows that if DLC layer 24 is too thin (i.e. 7 or 8 Angstroms), as it was in examples 1 and 4, overcoat 20 will exhibit failure at a lower potential. However, thickness $T_D$ of DLC layer 24 can be reduced to 10 Angstroms (see example 3) and exhibit more corrosion resistance compared to comparative example A having thickness $T_D$ equal to 12.5 Angstroms. Because adhesion layer 26 is contributing corrosion resistance due to the addition of carbon and nitrogen, thickness $T_D$ of DLC layer 24 can be reduced since DLC layer 24 is not the only contributor to the total corrosion resistance of overcoat 20.

The Tafel plot also shows that so long as thickness $T_D$ of DLC layer 24 is equal to or above 10 Angstroms, thickness $T_A$ of adhesion layer 26 can be reduced to about 4 Angstroms without observing an onset of failure at lower potentials. Thus, examples 2-3 and 5-6, having total overcoat thickness $T_T$ less than or about equal to the total overcoat thickness of comparative example A, are more corrosion resistant than comparative example A in which the adhesion layer is essentially pure silicon.

Examples 7-8

Examples 7 and 8 were essentially identical to one another in the composition of adhesion layer 26 and DLC layer 24. The method of forming adhesion layer 26 and DLC layer 24 was essentially identical for examples 7 and 8. Like examples 1-6, the variables among examples 7 and 8 were thickness $T_A$ of adhesive layer 26 and thickness $T_D$ of DLC layer 24.

Examples 7 and 8 were made starting with a carbon silicon carbide target of approximately 19 to 21 atomic percent silicon and approximately 79 to 81 atomic percent carbon. The actual composition of adhesion layer 26 is verified through an x-ray photoelectron spectroscopy (XPS) depth profile technique.

In examples 7 and 8, adhesion layer 26 was deposited onto surface 22 of slider 10 through ion beam sputter deposition. The process parameters and monitoring systems were similar to those described above in reference to examples 1-6. Also similar to examples 1-6, in examples 7 and 8, DLC layer 24 was deposited onto adhesion layer 26 by a filtered cathodic arc (FCA) deposition process.

Table 2 outlines thicknesses $T_A$ and $T_D$ of adhesion layer 26 and DLC layer 24, and total thickness $T_T$ of protective overcoat 20, for examples 7 and 8. Comparative example A (of Table 1), also listed in Table 2 below, was again used as a control sample. In comparative example A, the composition of adhesion layer 26 was essentially pure silicon.

TABLE 2

| Example Number | $T_A$ (Angstroms) - Adhesion Layer 26 CSiC | $T_D$ (Angstroms) - DLC Layer 24 | Total Thickness $T_T$ (Angstroms) - Overcoat 20 |
| --- | --- | --- | --- |
| 7 | 6.5 | 8.5 | 15 |
| 8 | 5 | 10 | 15 |
| Comparative Example A* | 8.5* | 12.5 | 21 |

*As explained above, adhesion layer 26 of comparative example A was pure silicon.

Tests similar to those performed on examples 1-6 were performed on examples 7 and 8 to compare the performance of adhesion layer 26 and DLC layer 24 when adhesion layer 26 is carbon silicon carbide, as compared to an adhesion layer of essentially pure silicon (comparative example A).

A DC polarography test (with testing conditions similar to those provided above for examples 1-6) was performed on examples 7-8 and comparative example A to observe the corrosive properties of examples 7-8 compared to comparative example A. A Tafel plot in FIG. 3, similar to the plot of FIG. 2, illustrates the results of the DC polarography test for examples 7-8 and comparative example A.

Figure 3:
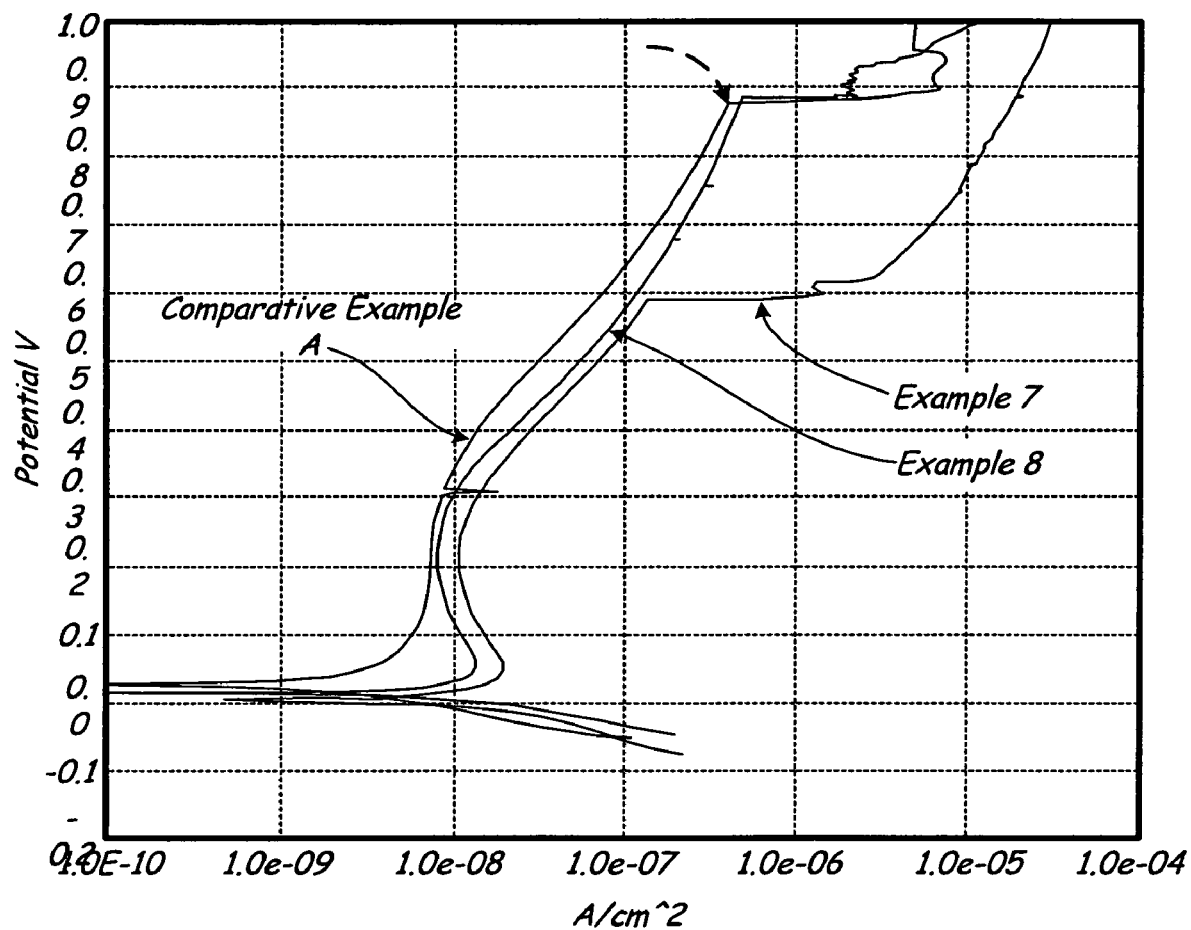
FIG. 3 is another graph of current as a function of potential to show the corrosion resistance of Examples 7 and 8 of the present invention.

FIG. 3 is a plot of current as a function of potential. As mentioned above, an overcoat provides adequate corrosion resistance to the corresponding metal substrate if the overcoat is able to endure a high current without exhibiting film failure. As described above in reference to FIG. 2, comparative example A exhibited failure at a potential of approximately 0.875 volts. (Similar to FIG. 2, the broken-line arrow in FIG. 3 shows the occurrence of film failure for comparative example A. Examples 7-8 exhibited film failure when there was a similar shift in the curve to that marked for comparative example A.) Example 8 having a thinner adhesion layer 26 and a slightly thinner DLC layer 24 showed similar failure results to those of comparative example A. Again, the results in FIG. 3 show that if adhesion layer 26 includes a non-silicon component like carbon, overcoat 20 may be made thinner without sacrificing corrosion resistance. Similarly, if adhesion layer 26 is the same thickness as an adhesion layer comprising only silicon, adhesion layer 26 will have improved corrosion resistance in comparison.

FIG. 3 also demonstrates, consistent with results from FIG. 2, that if DLC layer 24 is too thin (below about 10 Angstroms), film failure occurs at a lower potential regardless of thickness $T_A$ of adhesion layer 26.

The present invention relates to a thin adhesion layer that exhibits sufficient adhesive properties and corrosion resistance. Although the present invention has been described above in reference to a protective overcoat for a magnetic read and/or write head, it is recognized that the present invention could be used in other applications in which a thin overcoat may be preferred or required. For example, the present invention could be used for other parts of a disc drive system or any other type of metal substrate.

Although the present invention has been described with reference to preferred embodiments, workers skilled in the art will recognize that changes may be made in form and detail without departing from the spirit and scope of the invention.

The invention claimed is:

1. An apparatus comprising:
   a metal substrate;
   an amorphous adhesion layer on the metal substrate, wherein the adhesion layer has a thickness of less than about 8 Angstroms, and has a composition selected from the group consisting of carbon silicon carbide and carbon silicon nitride; and
   a protective DLC layer over the adhesion layer.

2. The apparatus of claim 1, wherein the DLC layer has a thickness less than or equal to about 15 Angstroms.

3. The apparatus of claim 1, wherein the thickness of the adhesion layer is less than about 7 Angstroms.

4. The apparatus of claim 1, wherein the thickness of the adhesion layer is less than about 6 Angstroms.

5. The apparatus of claim 1, wherein the thickness of the adhesion layer is less than about 4 Angstroms.

6. The apparatus of claim 1, wherein the composition of the adhesion layer is about 65 to 85 atomic percent carbon and about 15 to 35 atomic percent silicon.

7. The apparatus of claim 6, wherein the composition of the adhesion layer is about 70 to 80 atomic percent carbon and about 20 to 30 atomic percent silicon.

8. The apparatus of claim 1, wherein the composition of the adhesion layer is about 10 to 25 atomic percent carbon, about 30 to 50 atomic percent silicon, and about 25 to 55 atomic percent nitrogen.

9. The apparatus of claim 8, wherein the composition of the adhesion layer is about 15 atomic percent carbon, about 45 atomic percent silicon, and about 40 atomic percent nitrogen.

10. The apparatus of claim 1, wherein the apparatus is a magnetic read/write head.

* * * * *